April 16, 1963  S. H. RASKIN  3,085,642
WEIGHING DEVICE AND METHOD
Filed Jan. 28, 1960  3 Sheets-Sheet 1

Seymour H. Raskin
INVENTOR.

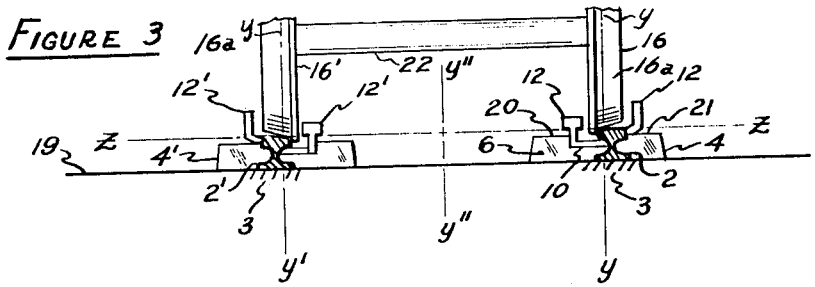
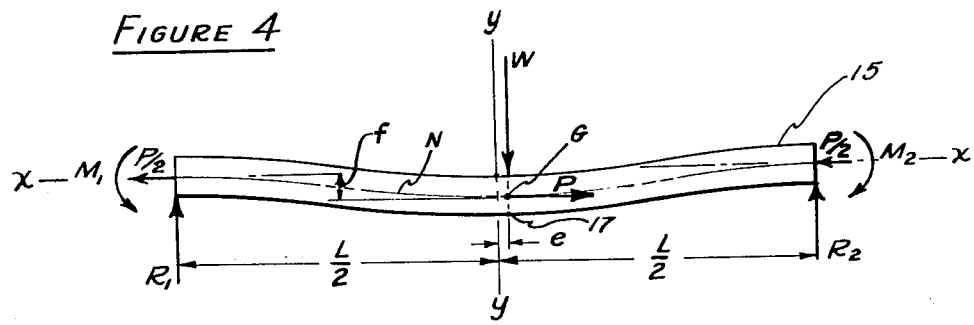
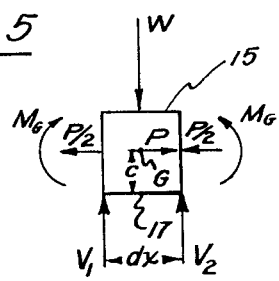
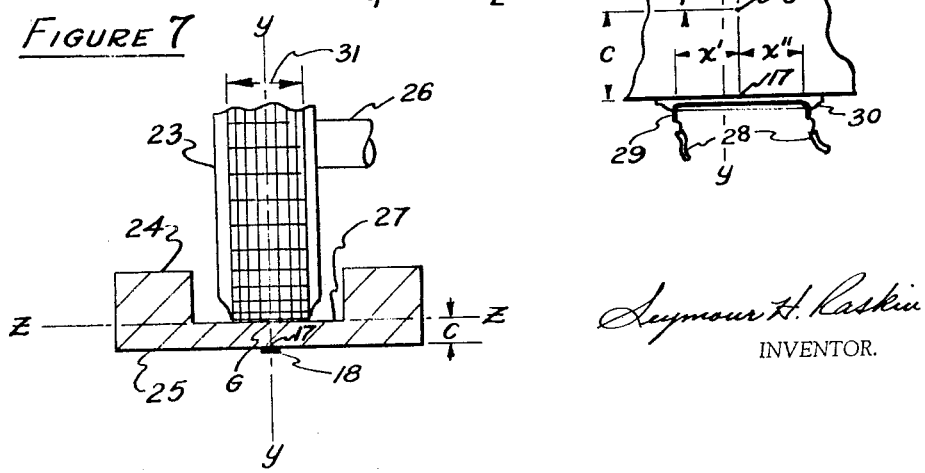

April 16, 1963     S. H. RASKIN     3,085,642

WEIGHING DEVICE AND METHOD

Filed Jan. 28, 1960     3 Sheets-Sheet 3

Seymour H. Raskin
INVENTOR.

United States Patent Office 3,085,642
Patented Apr. 16, 1963

3,085,642
WEIGHING DEVICE AND METHOD
Seymour H. Raskin, Dallas, Tex., assignor to Mectron Corporation, Dallas, Tex., a corporation of Texas
Filed Jan. 28, 1960, Ser. No. 5,296
11 Claims. (Cl. 177—134)

This invention relates to the weighing of moving objects. More specifically, this invention is directed to an apparatus and method for weighing objects that roll or slide across a weight-sensitive platform.

It is well known in the art that, for example, when weighing highway vehicles, it is necessary to provide an approach surface and a departure surface adjacent to the weight-sensitive platform as a means for rolling the vehicle onto and off the platform. The approach and departure surfaces are rigid, or fixed, but the weight-sensitive platform must be free to either move vertically or transmit vertical force as a function of the vehicle weight. It has therefore been necessary to provide a gap, or physical separation, between the platform and the adjacent fixed surfaces so that the platform can react independent of the adjacent fixed surfaces. However, the weight-sensitive platform must be restrained from horizontal motion relative to the separate, fixed surfaces. Such horizontal restraints commonly utilize rollers, tie-rods, flexure plates, and the like.

Such existing scales require considerable structure and maintenance of adjustments to insure that the movable platform is properly separated and restrained from the adjacent fixed surfaces. Further, the sudden application of weight-forces on the platform, which occurs when the vehicle wheels cross the gap between fixed and movable surfaces, introduce impact loads which aggravate the maintenance problem and which sometimes create difficulty in measuring the true weight of the vehicle.

Figure 1:
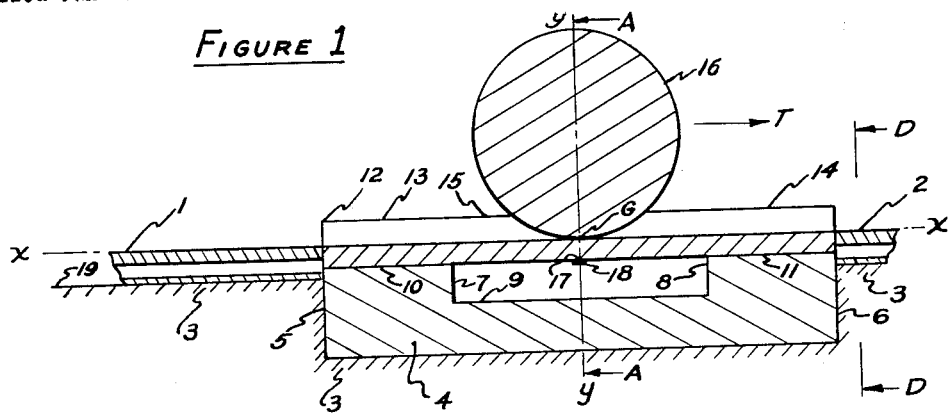
Figure 2:
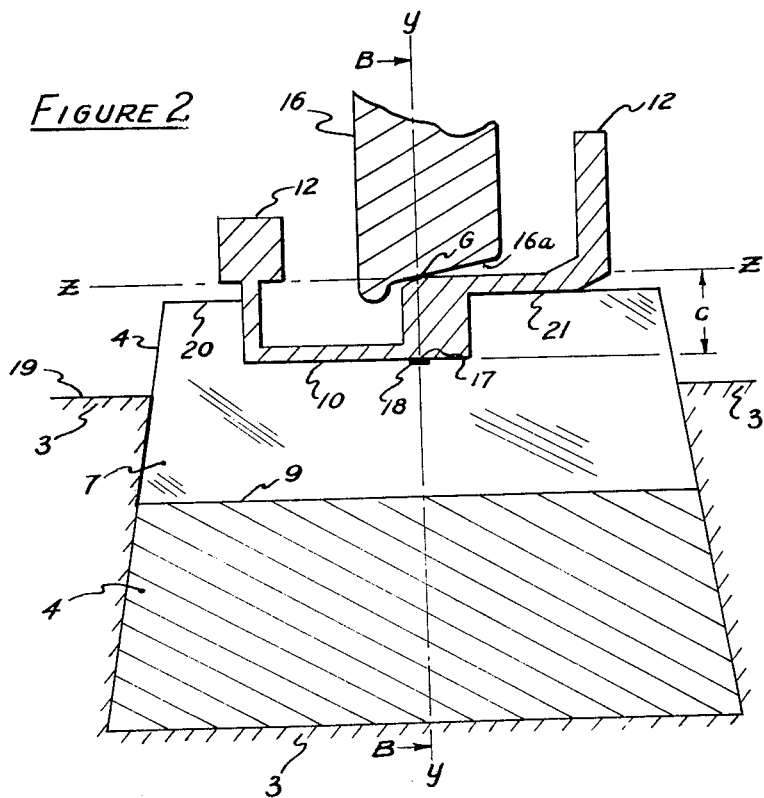
Figure 8:
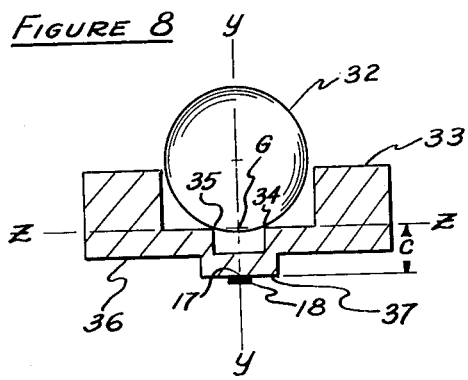
Figure 9:
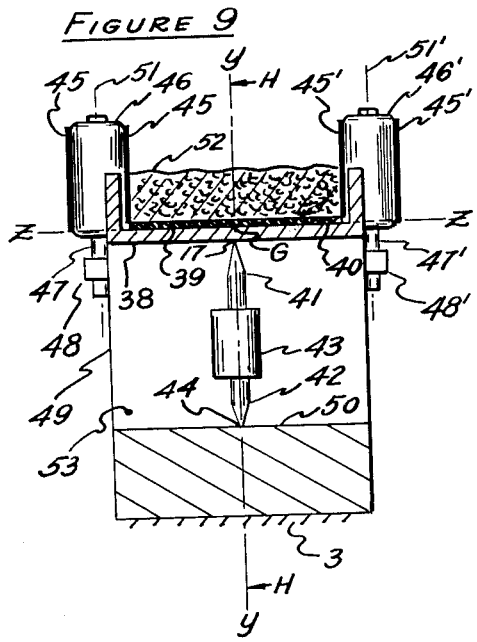
Figure 10:
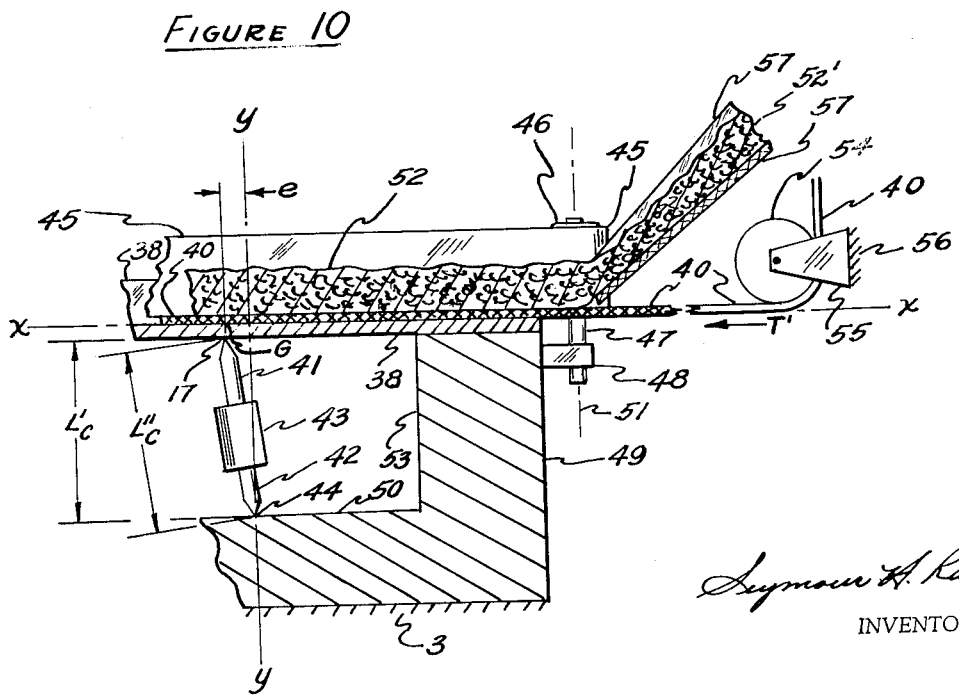

It is therefore an object of this invention to provide a weighing device wherein the weight-sensitive platform is integral with the adjacent approach and departure surfaces and wherein there are substantially no moving parts. The resulting savings in the cost of construction and maintenance, as well as other objects and advantages, will become apparent from the following description in connection with the accompanying drawings, in which:

FIGURES 1 and 2 are partial cross-section views of a device embodying the features of the present invention for weighing railroad cars, with FIGURE 1 taken along B—B of FIGURE 2 and with FIGURE 2 taken along A—A of FIGURE 1, FIGURE 3 is a cross-section view taken along D—D of FIGURE 1, FIGURE 4 is a diagram of the external forces acting on the weight-sensitive portion of the beam of FIGURE 1, FIGURE 5 is a diagram of the external and internal forces acting on an imaginary portion of the beam of FIGURE 4, FIGURE 6 is a detailed diagrammatic view of a strain gage bonded to the weight-sensitive beam, FIGURE 7 is a partial cross-section view of a modification of the present invention for use in weighing highway vehicles, FIGURE 8 is a partial cross-section view of a further modification of the present invention for use in weighing spherical objects, FIGURE 9 is a cross-section view of a still further modification of the present invention for use in the continuous weighing of bulk materials being conveyed on a moving belt, and FIGURE 10 is a cross-section view taken along H—H of FIGURE 9.

Referring now to the drawings and first to FIGURE 1, rail 1 is one of a pair of rails forming the approach track to a railroad track-scale. Rail 2 is one of a pair of rails forming the departure track. Rails 1 and 2 are rigidly supported by ground 3 along elevation 19. The track scale includes a base 4, which may be constructed from concrete, for example, and a beam 12. Base 4 is rigidly supported along its bottom surface and along end walls 5 and 6 by the ground 3.

Beam 12 has end portions 13 and 14 which are rigidly affixed to the base 4 along surfaces 10 and 11 respectively, and these end portions serve as the fixed approach and departure surfaces of the scale. Portion 15 of beam 12 is free from external support, because it spans the cavity in base 4 formed by walls 7 and 8 and surface 9. Portion 15 serves as the weight-sensitive platform of the scale.

Vertical axis $y$—$y$ is equidistant from walls 7 and 8, and intersects the bottom surface of beam 12 at a point 17 midway along the unsupported length of beam portion 15.

A wheel 16 of a railroad car (not shown), having a frusto-conical peripheral surface 16a which extends angularly relative to the horizontal axis of rotation of the wheel, is supported by beam portion 15 only at point G. Point G lies at the intersection of vertical axis $y$—$y$ and longitudinal axis $x$—$x$. Wheel 16 has its center along axis $y$—$y$ and is in motion at a velocity T in the direction shown. A common type of strain gage 18 is bonded to the bottom surface of beam portion 15 at point 17 in order to measure the stress in the bottom-most fibers of beam portion 15. It will later be shown that the stress, or strain, indicated by strain gage 18 will be substantially proportional to the vertical weight force being exerted by wheel 16 on beam portion 15.

In FIGURE 2, the unusual cross-section configuration of beam 12 is apparent, and this cross section is uniform along the entire length of beam 12. It can also be seen that base 4 extends upwardly beyond surface 10 as shown at surfaces 20 and 21. The other end of base 4 is similarly constructed to provide additional rigidity to the end portion of the beam.

It is important to note that point G occurs at the mutual intersection of axes $y$—$y$ and $x$—$x$ and $z$—$z$, and that point 17 lies along vertical axis $y$—$y$ a distance $c$ below point G. The significance of these dimensions will be explained later.

FIGURE 3 shows a pair of devices similar to the device of FIGURES 1 and 2, with the pair of devices comprising the total track scale. Rail $2'$, base $4'$, beam $12'$ and wheel $16'$ are mirror images about centerline $y''$—$y''$ of rail 2, base 4, beam 12 and wheel 16 respectively. Axis $y'$—$y'$ is the vertical axis of beam $12'$. Wheels 16 and $16'$ are connected by integral axle 22 so that the combined weight transmitted by wheels 16 and $16'$ is the "axle weight" of the car. Axis $z$—$z$ is common to each of the pair of weighing structures.

Again referring to FIGURE 2, the cross section of beam 12 is designed so that the center of gravity of the cross-section area is at point G. Since the neutral axis of a beam in bending contains the center of gravity of the cross-section area when there is no resultant axial ($x$—$x$) stress, then point G is contained in the neutral axis of the beam. Axis $y$—$y$ is the intersection between the vertical neutral plane and the cross section for transverse ($z$—$z$) bending.

To further examine the characteristics of the neutral axis in this beam, reference is made to the diagram of FIGURE 4. Beam portion 15 is schematically shown as a free body at rest, having bending moments $M_1$ and $M_2$ exerted on its ends by beam portions 13 and 14 respectively. Similarly, vertical reactions $R_1$ and $R_2$ are being exerted by beam portions 13 and 14 respectively. Length L between reactions $R_1$ and $R_2$ corresponds to the distance between walls 7 and 8 of FIGURE 1. Weight force W is being exerted on the beam at point G by wheel 16, and is a vertical force. Due to the resistance to rolling of wheel 16, a horizontal force P is also being exerted through point G by wheel 16. Opposite horizontal reaction $P/2$ is being exerted as a compressive axial force on the right end of beam portion 15 by beam portion 14, and another horizontal reaction $P/2$ is being exerted as a tensile axial force on the left end by beam portion 13. Both of these forces $P/2$ and $P/2$ coincide with the $x$—$x$ axis.

By inspection of FIGURE 4, when force P is greater than zero, point G will move to the right of the $y$—$y$ axis by a distance $e$. This movement of point G is caused by deformation of the beam material, and can be expressed as $$e = (P/2) \times (L/2) \times (1/AE) \quad \text{(Eq. 1)}$$

where A is the area of the beam cross section and E is the modulus of elasticity of the beam material. When force P is equal to zero, distance $e$ will also equal zero.

The weight force W will cause the neutral axis of the beam, shown as line N, to deflect downward from the original axis $x$—$x$, and the maximum deflection $f$ due to bending will occur at point G when force P is equal to zero. Deflection $f$ can be expressed as $$f = \frac{WL^3}{192EI} \quad \text{(Eq. 2)}$$

where I is the rectangular moment of inertia of the beam cross section.

Also, when force P is equal to zero, $$R_1 = W/2 \quad \text{(Eq. 3)}$$
$$R_2 = W/2 \quad \text{(Eq. 4)}$$
$$M_1 = -(WL)/8 \quad \text{(Eq. 5)}$$
$$M_2 = -(WL)/8 \quad \text{(Eq. 6)}$$

and the bending moment at $L/2$ (containing point G because force P and distance $e$ equal zero here) will be $$M_g = (WL)/8 \quad \text{(Eq. 7)}$$

The stress at point 17 can be expressed as $$S_{17} = M_g(c/I) \quad \text{(Eq. 8)}$$

and by substituting Eq. 7 in Eq. 8, $$S_{17} = (WLc)/(8I) \quad \text{(Eq. 9)}$$

Since we have assumed force P to equal zero in the above equations, the distance $c$ from point 17 to the neutral axis N will be the distance from point 17 to point G because the neutral axis N contains point G.

However, I have already stated that force P will usually be greater than zero when the car is in motion across beam portion 15. The introduction of force P will cause changes in the reacting forces $R_1$ and $R_2$ and in the reacting moments $M_1$ and $M_2$ even though weight W remains constant. These changes can each be analyzed separately by using the principles of superposition in an $M/EI$ diagram. It is safe to use the principles of superposition because the ratio of beam length to beam depth will be small enough, say 3:1, to avoid column effects from longitudinal forces P, $P/2$ and $P/2$.

As shown in FIGURE 4, weight W is being exerted at a point spaced from the left end of beam portion 15 by a distance equal to $L/2 + e$, because force P has caused point G to move to the right by a distance $e$. Therefore, by superposition, it can be written that:

$$R_1 = (W/L) \times (L/2 - e)$$

or $$R_1 = (W/2) - (We/L) \quad \text{(Eq. 10)}$$

and $$R_2 = (W/2) + (We/L) \quad \text{(Eq. 11)}$$

The superposed portion $$M_{g_{R_1}}$$

of bending moment $M_g$ which is caused by $R_1$ will change when $R_1$ changes, and is expressed as $$M_{g_{R_1}} = R_1 \times (L/2 + e)$$

or by substituting Eq. 10

$$M_{g_{R_1}} = (WL/4) - (We^2/L) \quad \text{(Eq. 12)}$$

Now to examine the changes in moment $M_g$ due to forces P, $P/2$ and $P/2$ acting about a moment arm equal to deflection $f$, refer to the diagram of FIGURE 5. An imaginary length of beam portion 15 is shown as having a length $dx$, where $dx = 0$. Since, at the cross section represented by length $dx$, forces P, $P/2$ and $P/2$ all act along a common line passing through point G, then the superposed portion $M_{g_p}$ of moment $M_g$ due to force P will be $$M_{g_p} = 0 \quad \text{(Eq. 13)}$$

but these forces P, $P/2$ and $P/2$ will affect moments $M_1$ and $M_2$ as shown below.

Again referring to FIGURE 4, the reacting moments, by superposition, will be $$M_1 = -(WL/4 - We^2/L)(1/2 - e/L) + Pf/2 \quad \text{(Eq. 14)}$$

and $$M_2 = -(WL/4 - We^2/L)(1/2 + e/L) - Pf/2 \quad \text{(Eq. 15)}$$

That superposed portion $M_{g_m}$ of moment $M_g$ due to moments $M_1$ and $M_2$ will be $$M_{g_m} = M_1 + (M_2 - M_1)(L/2 + e)(1/L) \quad \text{(Eq. 16)}$$

or, by substituting Eq. 14 and Eq. 15 in Eq. 16, $$M_{g_m} = -(WL/8) + (2We^4/L^3) - (Pfe/L) \quad \text{(Eq. 17)}$$

By adding all of the superposed portions of moment $M_g$ $$M_g = M_{g_{R_1}} + M_{g_p} + M_{g_m} \quad \text{(Eq. 18)}$$

and by substituting Eq. 12, Eq. 13 and Eq. 17 in Eq. 18, $$M_g = (WL/8) - (We^2/L) + (2We^4/L^3) - (Pfe/L) \quad \text{(Eq. 19)}$$

This equation (Eq. 19) expresses the total value of moment $M_g$ when force P is greater than zero. Now to assign some practical design values, let $I = 120$ inches$^4$
$E = 30 \times 10^6$ lbs./inches$^2$
$A = 10$ inches$^2$
$L = 24$ inches
$W = 24,000$ lbs. (maximum)
$P = 24,000$ lbs. (maximum for maximum W)

where P is based on an impossibly high coefficient of friction (100%) in order to assume the worst condition.

By substituting the above values in Eq. 19, and utilizing Eq. 1 and the approximate value of Eq. 2, which is practical for this purpose, it can be written that the moment $M_g$ will be $$M_g = 72,000 \text{ inch-lbs.} - .00576 \text{ inch-lbs.}$$

when force P is a maximum.

When force P equals zero and W equals 24,000 lbs., $$M_g = 72,000 \text{ inch-lbs.}$$

It can therefore be seen that the change in moment due to a maximum force P is a negligible change for any practical purpose of weighing a rolling railroad car; such change being expressed as percent error by $$100 \times \frac{72,000.00576 - 72,000}{72,000} = .000008\%$$

Since it has now been established that the moment $M_g$ will be substantially unchanged by force P, it only remains to measure moment $M_g$ in order to determine the weight W. It will now be shown that the stress at point weight W. It will now be shown that the stress at point 17 is also unaffected by force P. Inspection of FIGURE 5 makes it apparent that there is no longitudinal axial ($x$—$x$) stress on the beam segment of length $dx$, because external force P is reacted by opposite internal forces $P/2$ plus $P/2$. This absence of axial stress is only true in the cross-section plane containing point G and point 17. Inasmuch as there is no axial stress in the cross section containing point 17, the only stress acting on point 17 will be due to moment $M_g$. Also, the absence of axial stress in that cross section means that the neutral axis, at that cross section, will still contain point G, and dimension $c$ of Eq. 9 will be constant for any value of force P. It is therefore concluded that the stress $S_{17}$ is substantially a function of weight W and is independent of force P.

The further question arises as to the effect of any transverse ($z$—$z$) forces which may act on beam portion 15. Since vertical axis $y$—$y$ is the intersection at point G. Since vertical axis $y$—$y$ is the intersection between the vertical neutral plane and the cross section containing points G and 17, the bending stress on point 17 due to transverse ($z$—$z$) bending moments will be zero.

It can now be concluded that the stress at point 17 will be directly proportional to vertical weight forces only, and will be substantially unaffected by any horizontal forces introduced by car wheel 16.

As for the means of measuring stress, or strain, at point 17, FIGURE 6 shows a common type of strain gage bonded to beam portion 15. Gage element 29 is surrounded by insulation 30 and has a pair of electrical leads 28 connected at its ends. The strain-sensitive length of element 29 is equal to $x'$ plus $x''$, and $x'$ is equal to $x''$. Any longitudinal tensile stress and any change in bending stress occurring over the length $x'$ will be compensated by equal and opposite compressive longitudinal stress and change in bending moment over the length $x''$. The average strain measurement over the total length of element 29 will be equal to the strain at point 17.

Suitable electronic means may be connected to leads 28 for measuring the electrical resistance of the strain gage as a direct function of the weight W. The resistance will change as the wheel 16 rolls across beam portion 15. The change in resistance will be a smooth and gradual increase as the wheel 16 intially moves onto beam portion 15, and the resistance will reach a peak value when the wheel is directly over point 17. This characteristic of the resistance change during wheel travel offers two advantages. First, the smoothness of the change eliminates the need for any electronic damping of oscillations in the resistance signal caused by impact forces, and thereby allows for faster train or car speed during the weighing cycle. Second, the only time during the cycle that the resistance will be proportional to weight will be the peak point of the curve. This feature provides a reliable and recognizable time at which to make an instantaneous measurement of resistance, and therefore weight.

The resulting weighing method comprises rolling the wheel 16 across beam 12, measuring the stress in the beam at a selected point 17, and recording the proportional value of the stress when the stress reaches a peak. This proportional value of the stress will equal the weight of the car wheel and, by adding the weight from all wheels of car, the total car weight is obtained.

The foregoing description involves only one of the many applications of the present invention. FIGURE 7 shows a modification of the device for weighing highway vehicles, in which beam 24 has a weighing surface 27 and a bottom surface 25. While the configuration of the cross section of beam 24 is different from the cross section of previous beam 12, it can be seen that the center of gravity of the cross section of beam 24 still lies at point G and coincides with the intersection of axes $y$—$y$ and $z$—$z$. Wheel 23 having an axle 26 is supported by beam 24 and is in contact with beam 24 along a line which lies in the plane of surface 27 and coincides with axis $z$—$z$. The tread, or width, 31 of wheel 23 is centered about the axis $y$—$y$, so that point G is the midpoint of the line of contact between wheel 23 and surface 27. Any forces introduced into beam 24 by wheel 23 will be distributed along the entire length of the line of contact between the beam and wheel. The resultant of these, however, can be represented by a concentrated weight W and a concentrated longitudinal axial force P, both of which pass through point G.

FIGURE 7 does not show the base structure of the scale, because the base will be similar to the base 4 previously described. The external forces acting on beam 24 are identical to the forces in the diagram of FIGURE 4, provided the distributed loads are treated as concentrated forces W and P. The strain gage of FIGURE 7 will therefore measure the stress, or strain, at point 17, which is substantially proportional to the weight of wheel 23.

In FIGURE 8, a metal ball 32 is shown in the process of being weighed on a further modified beam 33, and ball 32 is in contact with beam 33 at points 34 and 35. Beam 33 has a surface 36 and a bottom surface 37. Here again, the center of gravity of the beam 33 cross section lies at point G, and the forces introduced into beam 33 at points 34 and 35 will have their resulting forces W and P passing through point G. It is necessary that points 34 and 35 be spaced equally from the $y$—$y$ axis.

The external forces acting on beam 33 are identical to the forces shown in the diagram of FIGURE 4, provided the loads on beam 33 are treated as resulting concentrated loads W and P.

In FIGURES 9 and 10, a still further modified beam 38 has a weighing surface 39 supporting an endless conveyor belt 40, which is in turn supporting a quantity of granular bulk material 52. Side belts 45, 45' are provided to prevent material 52 from contacting the side walls of beam 38, and are driven by rollers 46, 46' rotating about axes 51, 51' on shafts 47, 47' in brackets 48, 48'. Point G is the center of gravity of the beam cross section and lies at the mutual intersection of axes $y$—$y$, $z$—$z$ and $x$—$x$ when there is no deflection or distortion in the beam. Base 49 has an inner wall 53, which is spaced from the $y$—$y$ axis by a distance equal to one-half the length of the unsupported portion of beam 38.

By way of example only, a chute 57 is provided to guide the material 52' onto belt 40, and roller 54 guides belt 40, being supported by bracket 55 mounted at 56. Belt 40 is moving at a velocity T' in the direction shown.

In operation of the device of FIGURES 9 and 10, the belt 40 will introduce a frictional drag force $p$ as a distributed force over the entire area of surface 39. Fore $p$ is not shown, but the resultant concentrated force from this force $p$ can be visualized as a concentrated force P similar to force P in FIGURE 4. In addition to the longitudinal resultant force P, there will be a series of small and insignificant vertical distributed forces resulting from force $p$ because force $p$ over any increment of beam length is acting tangential to the slope of the deflection curve at that point.

The weight of material 52 over the unsupported length of beam 38 will be a distributed load over the entire area of surface 39. The lengthy derivation of bending moments and deflections for this modification of the invention have been omitted. However, even though the weight and longitudinal forces are distributed over an area in this case, I believe it is apparent that the cross section of beam 38 containing points 17 and G will not be subjected to any longitudinal axial ($x$—$x$) stress. The stress at point 17 will be substantially proportional to weight, being substantially a bending stress.

In any of the modifications of my device, the deflections $f$ will be substantially proportional to the weight W, and any change in deflection $f$ caused by a force P will be insignificant to the same degree as the previously described changes in moment $M_g$. I have therefore chosen in FIGURES 9 and 10 to measure the weight as a function of the deflection, and for this purpose have utilized strain-gage load cell 43. Load cell 43 has its upper extension 41 in contact with point 17 and its lower extension 42 in contact with base surface 50 at point 44. When deflection $f$ is equal to zero, the distance between points 17 and 44 will be equal to $L_c$ (not shown). When deflection $f$ is greater than zero, a true measurement of deflection would be $L'_c$ where $$L'_c = L_c - f \quad \text{(Eq. 20)}$$

But point 17 has moved horizontally by a distance $e$ and cell 43 is no longer vertical. The distance that will be sensed by cell 43 is $L''_c$ where $$(L''_c)^2 = (e)^2 + (L'_c)^2 \quad \text{(Eq. 21)}$$

or $$(L''_c)^2 = (e)^2 + (L_c - f)^2 \quad \text{(Eq. 22)}$$

If, by design, the length $L_c$ is made extremely long in relation to the expected values of dimensions $e$ and $f$, say: $L_c = 12$ inches; $e = .0005$ inch; and $f = .001$ inch; all of which are arbitrarily selected here, then the erroneous effect of distance $e$ on the deflection measurement will again be negligible.

While in all of the above modifications of this invention, as described above, the word "beam" has been used to describe the weight-sensitive portion of the scale, it should be noted that at pair of such beams constitute a pair of rails for the travel of railroad cars and highway vehicles. In those cases, the pair of beams, or rails, taken together constitute the scale platform over their unsupported weight-sensitive length and constitute the approach and departure surfaces over the length of their rigid end portions. It can then be said that this invention provides a scale platform whose structure is integral with the adjacent rigid approach and departure surfaces.

Also, the scale platform as a unit does not move in relation to the adjacent rigid surfaces; the only displacement in the platform is an internal deformation of the platform itself and does not occur at the junctures of the platform and adjacent surfaces. Therefore, in a commonly accepted mechanical sense, the scale can be said to have no moving parts.

While the beam has been treated as being weightless in the foregoing description, the weight of the beam itself is a constant and distributed force and, in practice, is treated as a "tare" load.

In the examples of this application, weight is the vertical component of a total physical force which has horizontal components in the longitudinal and transverse directions. Since the horizontal components may vary independent of the weight, or vertical, component, the resulting total physical force may be directed in any one of an infinite variety of directions. It can therefore be said that the method and apparatus of this invention can be utilized to measure a single directional component of a total force regardless of the cause of said force and regardless of the direction of said force. The error in measurement of the single directional component caused by other force components perpendicular to the single directional component will be insignificant in relation to an accuracy standard of, say, 0.1% of the measured force. For all practical purposes, the error will be substantially zero.

It is to be understood that the beam cross sections disclosed and described herein are by way of examples only. Other cross sections of different configurations may be designed to accomplish the same result and various other changes may be made in the specific mechanisms disclosed and described herein without sacrificing any of the advantages thereof and without departing from the scope of the appended claims.

I claim:

1. A device for weighing a moving object including: a beam having two end portions and an intermediate portion, each of said end portions being rigidly supported, said intermediate portion having a support surface for supporting an object moving across said beam, said intermediate portion being free to deflect in a direction perpendicular relative to its longitudinal axis, the center of gravity of said intermediate portion being disposed on the supporting surface whereby the friction between an object moving along said supporting surface and said supporting surface does not generate any forces which cause deflection of said beam in said direction perpendicular to its longitudinal axis; and means for measuring the deflection of said intermediate portion in a direction perpendicular to its longitudinal axis caused by the weight of the object as the object moves along said supporting surface.

2. A device for weighing a moving object including: a beam having two end portions and an intermediate portion, each of said end portions being rigidly supported, said intermediate portion having a support surface for supporting an object moving across said beam, said intermediate portion being free to deflect in a direction perpendicular relative to its longitudinal axis, the center of gravity of said intermediate portion being disposed on the supporting surface whereby the friction between an object moving along said supporting surface and said supporting surface does not generate any forces which cause deflection of said beam in said direction perpendicular to its longitudinal axis; and means for measuring the deflection of said intermediate portion in a direction perpendicular to its longitudinal axis caused by the weight of the object as the object moves along said supporting surface, said measuring means measuring the deflection of said intermediate portion along a line passing through the center of gravity of said intermediate portion.

3. In a weighing device, a beam having two end portions and an intermediate portion, each of said end portions being rigidly supported, said intermediate portion being integral with and supported by said end portions, said intermediate portion having a cross-section which is of uniform configuration along the entire length of said intermediate portion, said intermediate portion having a center of gravity which is located mid-way along the length of said intermediate portion, said intermediate portion having a supporting surface for supporting an object which moves along the beam, said center of gravity being at a point on said supporting surface whereby said moving object is in contact with said beam at the point of said center of gravity when said moving object is disposed midway along the length of said intermediate portion, the weight of said object thereby causing said intermediate portion to deflect in the direction of the force exerted by said weight; and means for measuring the deflection of said beam caused by said weight.

4. In a weighing device, a beam having two end portions and an intermediate portion, each of said end portions being rigidly supported, said intermediate portion being integral with and supported by said end portions, said intermediate portion having a cross-section which is of uniform configuration along the entire length of said intermediate portion, said intermediate portion having a center of gravity which is located mid-way along the length of said intermediate portion, said intermediate portion having a supporting surface for supporting a mass which moves along the length of said beam, said center of gravity being at a point on said supporting surface, said mass being in contact with said supporting surface whereby the weight of said mass causes a deflection of said beam, said deflection being in the same direction as the force exerted by said weight; and means for measuring said deflection.

5. A device for weighing the weight imposed by a rolling wheel on a rail, the wheel having a tapered peripheral supporting surface which extends angularly relative to its horizontal axis of rotation including: a rail having fixed end portions, said rail having an intermediate portion having a support surface engageable by said wheel rolling across said rail, said intermediate portion being free to deflect in a vertical direction; the center of gravity of said intermediate portion being disposed on the supporting surface whereby the forces exerted by a wheel rolling along said supporting surface, other than those caused by the weight imposed by the wheel on the rail, do not tend to cause deflection of said beam in a vertical direction; and means for measuring the deflection of said intermediate portion in said perpendicular direction caused by the weight imposed by the wheel on the rail as the wheel moves along said supporting surface.

6. A device for weighing the weight imposed by a rolling wheel on a rail, the wheel having a tapered peripheral supporting surface which extends angularly relative to its horizontal axis of rotation including: a rail having fixed end portions, said rail having an intermediate portion having a support surface engageable by said wheel rolling across said rail, said intermediate portion being free to deflect in a vertical direction; the center of gravity of said intermediate portion being disposed on the supporting surface whereby the forces exerted by the wheel rolling along said supporting surface, other than those caused by the weight imposed on the rail by the wheel, do not tend to cause deflection of said beam in a vertical direction; and means for measuring the deflection of said intermediate portion in said vertical direction as the wheel moves along said supporting surface, said measuring means measuring the deflection of said intermediate portion along a vertical line passing through the center of gravity of said intermediate portion.

7. A device for weighing a moving mass including: a beam having rigidly supported end portions and an intermediate portion, said intermediate portion having a supporting surface for supporting a mass moving across said beam, said intermediate portion being free to deflect in a direction perpendicular to said support surface, the center of gravity of said intermediate portion being disposed on the supporting surface whereby the friction between a mass moving along said supporting surface and said supporting surface does not generate any forces which cause deflection of said beam; and means for measuring the deflection of said intermediate portion in a direction perpendicular to said longitudinal axis caused by the weight of the mass as the mass moves along said supporting surface.

8. A device for weighing a moving mass including: a beam having rigidly supported end portions and an intermediate portion, said intermediate portion having a supporting surface for supporting a mass moving across said beam, said intermediate portion being free to deflect in a direction perpendicular to said support surface, the center of gravity of said intermediate portion being disposed on the supporting surface whereby the friction between a mass moving along said supporting surface and said supporting surface does not generate any forces which cause deflection of said beam; and means for measuring the deflection of said intermediate portion in a direction perpendicular to said longitudinal axis caused by the weight of the mass as the mass moves along said supporting surface, said mass comprising a flexible member slidable along said support surface, said member being adapted to bear a load of granular material.

9. A device for weighing the weight imposed by a rolling wheel on a rail, the wheel having a tapered peripheral supporting surface which extends angularly relative to its horizontal axis of rotation including: a rail having fixed end portions, said rail having an intermediate portion having a support surface engageable by said wheel rolling across said rail, said intermediate portion being free to deflect in a vertical direction; said intermediate portion being uniform in cross sectional configuration throughout its length, the center of gravity of said intermediate portion being disposed on the supporting surface whereby the forces exerted by a wheel rolling along said supporting surface, other than those caused by the weight imposed by the wheel on the rail, do not tend to cause deflection of said beam in a vertical direction; and means for measuring the deflection of said intermediate portion in said perpendicular direction caused by the weight imposed by the wheel on the rail as the wheel moves along said supporting surface.

10. A device for weighing the weight imposed by a rolling wheel on a rail, the wheel having a tapered peripheral supporting surface which extends angularly relative to its horizontal axis of rotation including: a rail having fixed end portions, said rail having an intermediate portion having a support surface engageable by said wheel rolling across said rail, said intermediate portion being uniform in cross sectional configuration throughout its length, said intermediate portion being free to deflect in a vertical direction; the center of gravity of said intermediate portion being disposed on the supporting surface whereby the forces exerted by the wheel rolling along said supporting surface, other than those caused by the weight imposed on the rail by the wheel, do not tend to cause deflection of said beam in a vertical direction; and means for measuring the deflection of said intermediate portion in said vertical direction as the wheel moves along said supporting surface, said measuring means measuring the deflection of said intermediate portion along a vertical line passing through the center of gravity of said intermediate portion.

11. A device for weighing a moving mass including: a beam having rigidly supported end portions and an intermediate portion, said intermediate portion having a supporting surface for supporting a mass moving across said beam, said intermediate portion being free to deflect in a direction perpendicular to said support surface, said intermediate portion being uniform in cross sectional configuration throughout its length, the center of gravity of said intermediate portion being disposed on the supporting surface whereby the friction between a mass moving along said supporting surface and said supporting surface does not generate any forces which cause deflection of said beam; and means for measuring the deflection of said intermediate portion in a direction perpendicular to said longitudinal axis caused by the weight of the mass as the mass moves along said supporting surface.

References Cited in the file of this patent

UNITED STATES PATENTS 2,866,137     Blosser _____ Dec. 23, 1958

FOREIGN PATENTS 797,161     Great Britain _____ June 25, 1958